June 4, 1957  C. G. KING  2,794,528
SAFETY GUARDS FOR POWER OPERATED MACHINES
Filed Oct. 16, 1953
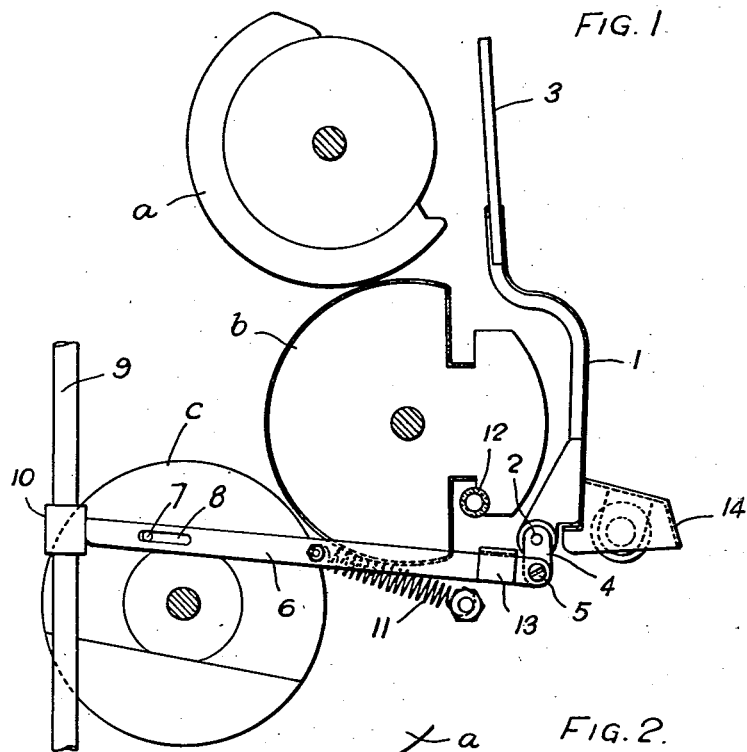
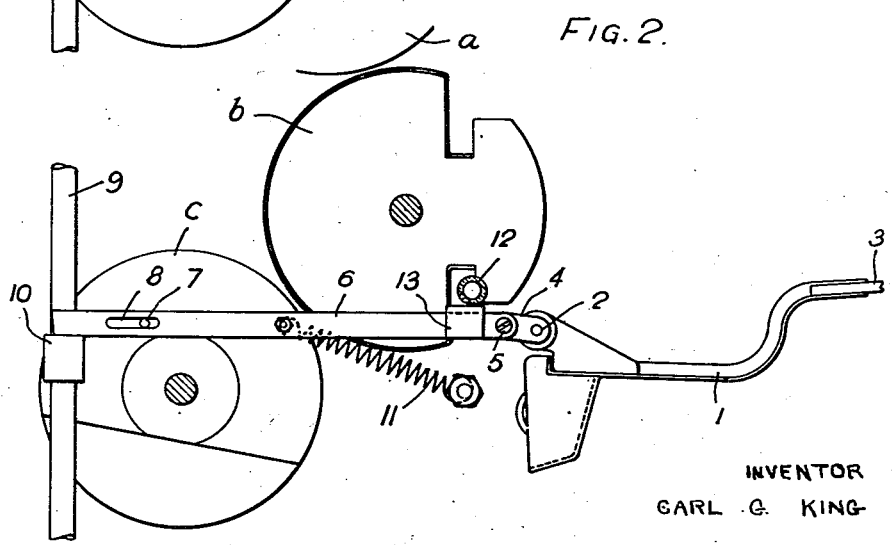
INVENTOR
CARL G. KING United States Patent Office 2,794,528
Patented June 4, 1957

2,794,528

SAFETY GUARDS FOR POWER OPERATED MACHINES

Carl Gustave King, Kenton, England, assignor to Rotaprint Limited, London, England, a British company Application October 16, 1953, Serial No. 386,630

Claims priority, application Great Britain November 4, 1952

3 Claims. (Cl. 192—133)

This invention relates to safety guards for power operated machines. The invention is particularly but not necessarily limited to safety guards for printing machines of the lithographic offset type where it is usually necessary for the machine to be turned by hand while the power drive is shut off in order to make various settings or adjustments before a printing run commences.

It is an object of the present invention to provide an improved safety guard which will ensure complete safety against accidental starting up of the machine while an operator is making adjustments, and also ensures that the guard will be locked in safety position while the machine is operating under power.

According to the present invention means for controlling a safety guard for a power operated machine comprises a member connected for movement with said guard as the latter is moved into and out of operative position and a device connected with mechanism adapted to be moved to connect or "shut off" the supply of power for operating said machine, said member and device being movable in intersecting paths of travel and being so arranged that when the guard is in operative position the device is disposed in the path of said member to lock the guard in operative position, and when the guard is in inoperative position said member is disposed in the path of said device to lock said mechanism in "shut off" position.

To enable the invention to be fully understood it will now be described with reference to the accompanying drawing, in which:

Fig. 1 is a side view of a safety guard according to one embodiment of the invention, the guard being shown in its closed or operative position; and Fig. 2 is a view similar to Fig. 1 but showing the guard in its open or inoperative position.

As shown in the accompanying drawing a safety guard is shown as mounted on a lithographic offset printing machine having rollers indicated by a, b, c. As shown the guard 1 is pivotally mounted at 2 to part of the frame of the machine, the guard being of such dimensions that when in its operative position it extends in front of the printing rollers and the adjacent moving parts of the machine to prevent the operator coming into contact therewith. Preferably the guard is provided with a portion 3 made of perspex or other transparent material to form an inspection window. It will be noted that the guard extends in a vertical plane in closed or operative position, and in a substantially horizontal plane when in open or inoperative position.

The lower end of the guard has a link 4 secured thereto, the free end of the link being pivoted at 5 to an arm 6 which is guided for movement in a substantially horizontally extending path by a pin 7 engageable in a slot 8 in the arm.

In order to connect and disconnect the power drive for operating the machine, a vertically extending shaft 9 is provided carrying a stop device in the form of a collar 10. The shaft 9 is adapted to be moved upwardly to the position shown in Fig. 1, to engage a clutch (not shown) when it is desired to couple the power drive to operate the machine and effect the rotation of the rollers a, b, c. The shaft is moved downwardly into the position shown in Fig. 2 to disengage the clutch to "shut off" the power drive. The arm 9 and the collar 10 are adapted to form control or locking means for the guard, and for this purpose the collar 10 is movable in a path which intersects the path of the arm 6. As shown the arm 6 is movable in a substantially horizontal plane while the shaft 9 which carries the collar 10 is movable in a substantially vertical plane. The relative positions of the arm and collar are so arranged that when the guard 1 is in operative position (as shown in Fig. 1) and the power drive is operating, the collar 10 is positioned to form an abutment or stop which prevents movement of the arm 6 towards the left, as shown in the drawings, and accordingly the guard is held locked in its operative position while the machine is running under power.

To "shut off" the power, the shaft 9 is moved downwardly into the position shown in Fig. 2 and the collar 10 will then be located below the path of movement of the arm 6 and accordingly the guard member can now be lowered into the open or inoperative position. When, however, the guard is lowered to the position shown in Fig. 2, the free end of the arm 6 extends across the path of movement of the collar 10 and forms an abutment or stop, therefore preventing upward movement of the shaft 9. Accordingly the present invention provides means which prevents the safety guard being moved into in operative position while the machine is running under power, and also prevents the machine being started up while the safety guard is in its open or inoperative position.

As shown a spring 11 is connected with the arm 6 and adapted to provide a counter-balance force tending to prevent too rapid a downward movement to the guard and also serving as a means to retain the guard in position when it is raised to its operative position. The spring accordingly tends to hold the guard in operative position even when the power is "shut off" and the shaft 9 lowered to displace the collar 10 from abutting engagement with the end of the arm 6.

As the arm 6 by virtue of its pivotal connection with the link 4 has a limited pivotal movement in addition to its sliding movement relative to the pin 7 a buffer stop 12 is provided adapted to be be engaged by the member 13 on the arm 6 when the guard is in open position.

Although the present invention is particularly suitable for lithographic offset printing machines it is not limited to this particular use, but may be used for other types of power operated machines. Further movement of the arm 6 connected with the guard member may be adapted to be controlled by any other suitable shaft, lever or other part which is movable into one position to connect the power drive to the machine and into another position to shut off said drive.

As shown the guard is provided with a housing 14 for an electric lamp.

I claim:

1. In a power operated lithographic printing machine having a power drive, a series of printing rollers and a slidably mounted control rod, the control rod being slidable into and out of a position in which it connects the power drive to the printing rollers, a projecting collar carried by said control rod, a pivotally mounted safety guard pivotable into an operative position in front of the rollers in which access to the rollers is prevented and pivotable out of said operative position into an inoperative position in which access to the rollers is permitted, a link having one end secured to the safety guard, a slidably mounted locking arm pivotally connected to the opposite end of said link, the locking arm having a free end and a spring connected to the locking arm, the spring resiliently retaining the safety guard in its operative position, the free end of the locking arm lying in the path of the collar when the safety guard is in its inoperative position to prevent movement of the control rod into its position in which it connects the power drive to the rollers and the collar lying in the path of the free end of the locking arm when the control rod is in its position in which it connects the power drive to the rollers to prevent movement of the safety guard from its operative position.

2. In a power operated lithographic printing machine having a power drive, a series of printing rollers and a slidably mounted control rod, the control rod being slidable vertically into and out of a position in which it connects the power drive to the printing rollers, a projecting abutment carried by said control rod, a pivotally mounted safety guard pivotable into an operative position in front of the rollers in which access to the rollers is prevented and pivotable out of said operative position into an inoperative position in which access to the rollers is permitted, a link having one end secured to the safety guard, and a locking arm slidable horizontally and pivotally connected to the opposite end of said link, the locking arm having a free end, a pin which engages in a linear slot in the locking arm to ensure slidable movement of the locking arm is horizontal, the free end of the locking arm lying in the path of the abutment when the safety guard is in its inoperative position to prevent movement of the control rod into its position in which it connects the power drive to the rollers and the abutment lying in the path of the free end of the locking arm when the control rod is in its position in which it connects the power drive to the rollers to prevent movement of the safety guard from its operative position.

3. In a power operated lithographic printing machine having a power drive, a series of printing rollers and a slidably mounted control rod, the control rod being slidable into and out of a position in which it connects the power drive to the printing rollers, a projecting abutment carried by said control rod, a pivotally mounted safety guard pivotable about a horizontal axis into an operative position in front of the rollers in which access to the rollers is prevented and pivotable about said axis out of said operative position into an inoperative position in which access to the rollers is permitted, a link having one end secured to the safety guard adjacent said horizontal axis, a slidably mounted locking arm pivotally connected to the opposite end of said link, the locking arm having a free end, and a spring connected to the locking arm, said spring resiliently retaining the safety guard in its operative position, the free end of the locking arm lying in the path of the abutment when the safety guard is in its inoperative position to prevent movement of the control rod into its position in which it connects the power drive to the rollers and the abutment lying in the path of the free end of the locking arm when the control rod is in its position in which it connects the power drive to the rollers to prevent movement of the safety guard from its operative position.

References Cited in the file of this patent
UNITED STATES PATENTS

| | | |
|---|---|---|
| 1,490,887 | Albrecht | Apr. 15, 1924 |
| 1,735,204 | Krantz | Nov. 12, 1929 |
| 1,735,745 | Gariglio | Nov. 12, 1929 |
| 1,736,975 | Krantz | Nov. 26, 1929 |
| 1,803,796 | Floyd et al. | May 5, 1931 |
| 1,881,974 | Skitt | Oct. 11, 1932 |
| 2,591,317 | Tholl | Apr. 1, 1952 |

FOREIGN PATENTS

| | | |
|---|---|---|
| 267,479 | Great Britain | Feb. 5, 1927 |